(12) United States Patent
Abler

(10) Patent No.: US 6,458,397 B1
(45) Date of Patent: Oct. 1, 2002

(54) STAGING SYSTEM FOR AUTOMATED CHEESE PROCESSING EQUIPMENT

(75) Inventor: Joseph H. Abler, Brookfield, WI (US)

(73) Assignee: Stainless Steel Fabricating, Inc., Columbus, WI (US)

( * ) Notice: Subject to any disclaimer, the term of this patent is extended or adjusted under 35 U.S.C. 154(b) by 0 days.

(21) Appl. No.: 09/970,326

(22) Filed: Oct. 3, 2001

(51) Int. Cl.$^7$ .......................... A01J 25/00; A23C 19/00
(52) U.S. Cl. .......................... 426/231; 99/452; 99/535; 426/582
(58) Field of Search .................. 426/231, 512, 426/524, 582; 99/452, 455, 535

(56) References Cited

U.S. PATENT DOCUMENTS

| | | |
|---|---|---|
| 1,339,212 A | 5/1920 | Mackenrot |
| 3,482,508 A | 12/1969 | Bajcar et al. |
| 3,779,034 A | 12/1973 | Morgan |
| 3,824,918 A | 7/1974 | Bronkhorst |
| 3,910,174 A | 10/1975 | Nelles |
| 4,068,014 A | 1/1978 | Heimbruch |
| 4,815,368 A | 3/1989 | Nelles |
| 4,820,540 A | 4/1989 | Budahn |
| 4,869,161 A | 9/1989 | LaCount |
| 4,902,523 A | 2/1990 | Fritchen et al. |
| 5,018,440 A | 5/1991 | Johnson |
| 5,195,426 A | 3/1993 | Thuli |
| 5,655,440 A * | 8/1997 | Misson .................. 99/452 |
| 5,881,639 A | 3/1999 | Nesheim et al. |

FOREIGN PATENT DOCUMENTS

EP 0 009 279 A1 7/1978

* cited by examiner

Primary Examiner—George C. Yeung
(74) Attorney, Agent, or Firm—George E. Haas; Quarles & Brady LLP

(57) ABSTRACT

A cheese processing system utilizes a liquid flume to convey blocks of cheese between two components of the system. A staging section is provided in the flume to accumulate cheese blocks into groups that are more easily handled by the component at the outlet of the flume. The staging section has a first movable stop mechanism against which the cheese blocks are detained. When a predefined amount of cheese blocks have accumulated, a second stop prevents additional cheese blocks from entering the staging section until the accumulated one can be released by the first movable stop mechanism. A unique flume structure is provided to direct the liquid flow into different channels to aid in rapidly forcing the detained blocks of cheese into and from the staging section.

23 Claims, 5 Drawing Sheets

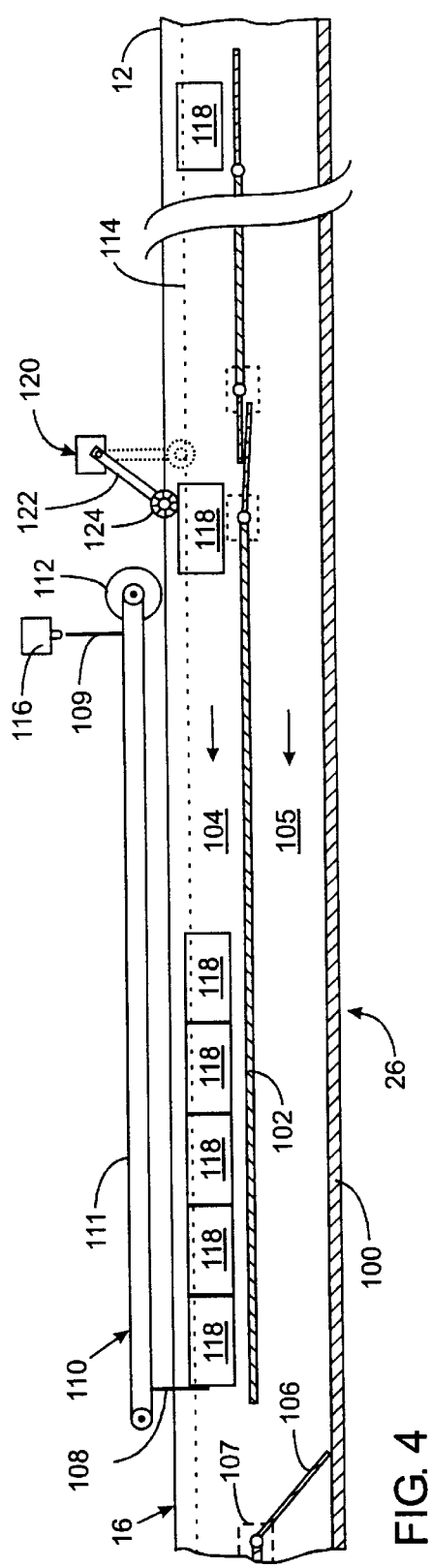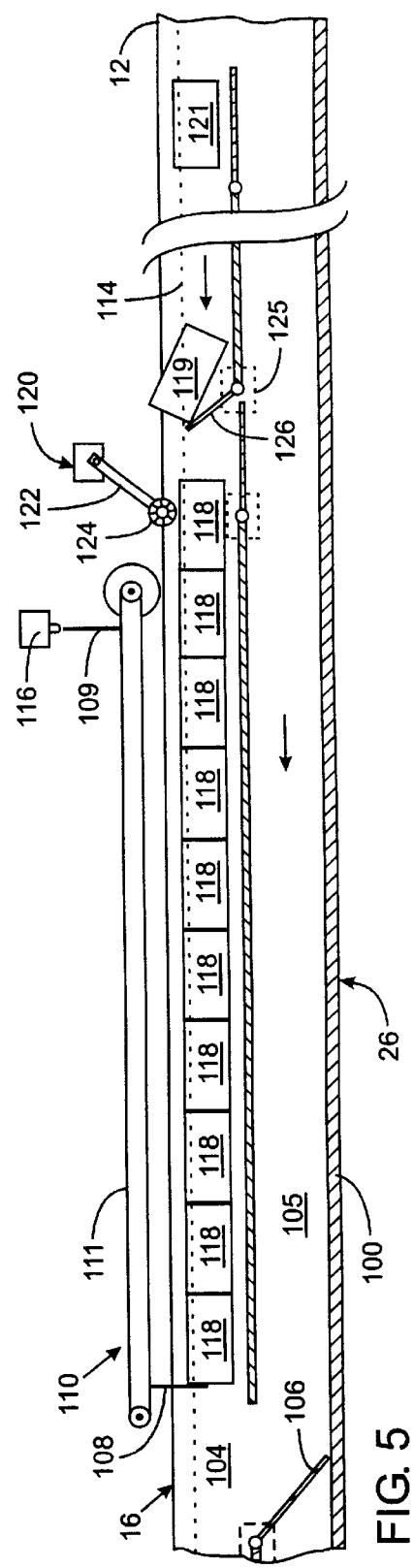

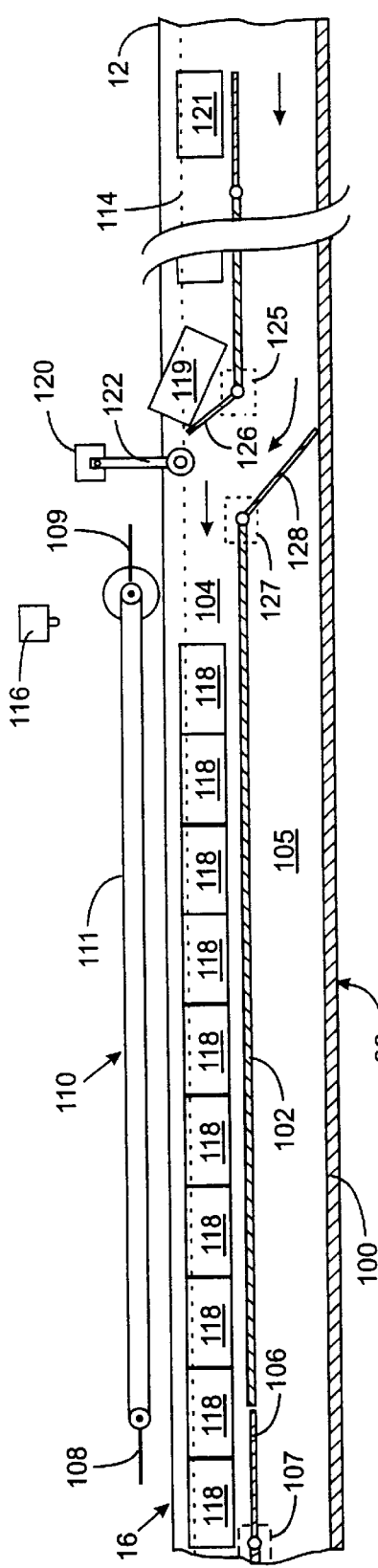
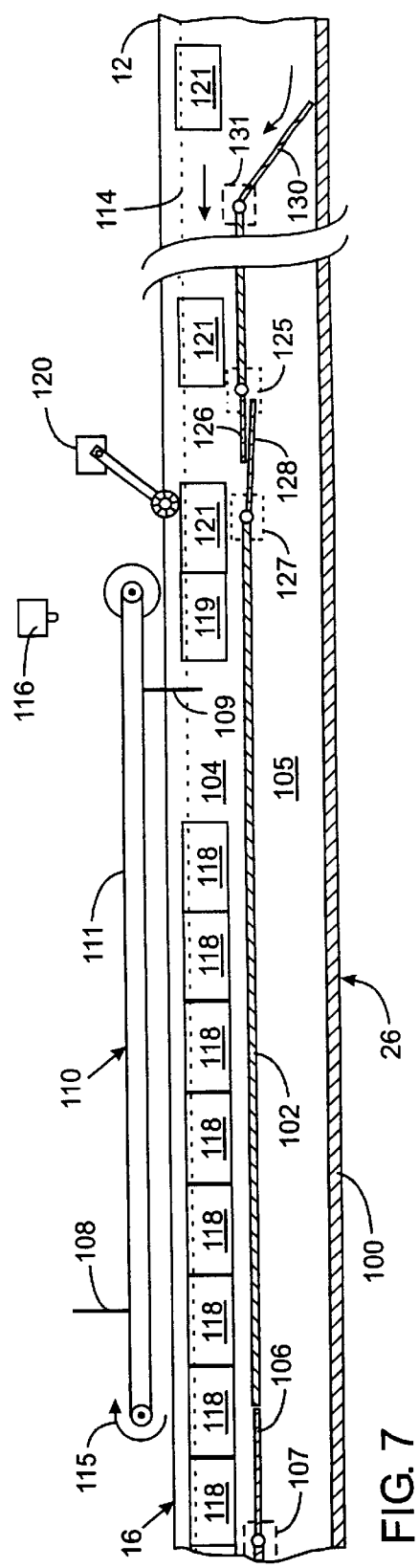
FIG. 6
FIG. 7

US 6,458,397 B1

STAGING SYSTEM FOR AUTOMATED CHEESE PROCESSING EQUIPMENT

CROSS-REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to equipment for producing cheese, such as mozzarella; and more particularly to equipment for cooling and salting newly formed blocks of cheese.

2. Description of the Related Art

Mozzarella cheese is commonly produced in five to twenty pound blocks or cylinders which are molded at a typical temperature of 135 degrees Fahrenheit. At this temperature the cheese block is very soft and can be deformed if not handled with care. Thus, before the cheese can be packaged, the blocks have to be cooled to approximately fifty degrees Fahrenheit. In addition, salt has to be added to the cheese if it was not added prior to the molding step. The finished product has from one to two percent salt by weight.

There are two processes presently being employed to cool the cheese and add salt after molding. In the first method, cheese emerging from the molding equipment drops into a serpentine open channel, or flume, through which brine flows. Cheese floats in a saturated brine, but sinks in fresh water. The brine flowing through the flume is cooled by refrigeration system to between 30 and 35 degrees Fahrenheit. The flume is sufficiently long so that cheese will be cooled to the desired temperature prior to packaging.

A drawback of the open flume system is that the cheese is not fully submerged and the upper surface, which is exposed to air, is not adequately cooled or salted. The exposed portion also dries out and becomes discolored if the block is not turned over periodically alone the flume. In addition hydraulic pressure tends to produce cupping of the top and bottom surfaces of the cheese blocks and bulging of the sides. Thus, workers must be positioned along the flume with tools to rotate the cheese blocks periodically to ensure uniform cooling and salting and to prevent deformation. This becomes very labor intensive.

A second cheese cooling system involves submerging the cheese in a large tank or pool of chilled brine. Typically the cheese blocks emerging from the molding machine are placed into a receptacle, such as a basket or rack, which is then mechanically lowered into the brine pool by an operator. This method ensures that all surfaces of the cheese are exposed to the brine and thus are cooled and salted uniformly. However, the submerging system still requires human operators to assist in filling and emptying the receptacles of cheese and manual monitoring of the time that each receptacle has been in the brine to know when cooling is complete. In addition, the last cheese block to be placed into the receptacle usually is the first one taken out, thereby resulting is some blocks being in the brine longer than others, which produces blocks with different salt content and temperature.

Regardless of which conventional cooling method is used, a high level of manual labor and supervision is required. Therefore, it is desirable to provide a more automated and efficient process for uniformly cooling and salting cheese products.

SUMMARY OF THE INVENTION

A cheese processing system employs a liquid flume to convey blocks of cheese between two components of the system, for example between the molding equipment and a brine tank which cools the cheese. A novel staging section is provided in the flume to control the delivery of the cheese blocks to the component at the end of the flume. The staging section enables the cheese blocks which enter the flume one at a time to be delivered in predefined groups at the flume outlet.

The staging section comprises a first stop mechanism having one position in which blocks of cheese are detained in the flume and another position in which the blocks of cheese are able to travel in the flume from the staging section. A sensor detects how much cheese has been detained by the first stop mechanism. Although the sensor may provide a count of the number of cheese blocks, the preferred sensor detects accumulation of a predefined length of cheese in the staging section. This preferred embodiment readily accommodates cheese blocks of various individual lengths, yet detects when a uniform amount of cheese has accumulated. That amount can correspond to the capacity of a receptacle in the cooling tank.

A controller is connected to the first stop mechanism and the sensor. The controller responds to a predefined amount of cheese being detained by the first stop mechanism by placing the first stop mechanism into the second state to allow the accumulated blocks of cheese pass to exit the staging section.

The preferred staging system further comprises a moveable second stop mechanism located in the flume upstream of an inlet to the staging section to restraint additional blocks of cheese from entering the staging area while a previously accumulated group of cheese blocks exits.

Another aspect of the present invention is a structure that controls the flow of liquid through the staging area to move the cheese blocks. An internal wall divides the flume in the staging section into first and second channels through which liquid in the flume normally flows, When it is desired to move an accumulated group of cheese blocks out of the staging section, a first flow gate is activated to direct the liquid flow from the second channel into the first channel near the staging section inlet. Thus substantially the full liquid flow in the flume now passes through the first channel which increases the force acting on the cheese blocks and quickly overcomes their inertia. A second flow gate is activated to direct the liquid flow from the second channel into the first channel farther upstream in the flume when it is desired to drive the cheese blocks detained by the second stop mechanism into the staging area.

BRIEF DESCRIPTION OF THE DRAWINGS

FIG. 4 is a longitudinal cross-sectional view from one side of a primary flume in FIG. 1 showing blocks of cheese accumulating in a staging section;

FIG. 5 is a longitudinal cross-sectional view from the side of the primary flume with the staging section fully loaded with blocks of cheese;

FIG. 6 is a longitudinal cross-sectional view from one side of the primary flume showing blocks of cheese flowing out of the staging section; and FIG. 7 is a longitudinal cross-sectional view from one side of the primary flume showing new blocks of cheese entering the staging section while a group of previously accumulated cheese blocks exit.

DETAILED DESCRIPTION OF THE INVENTION

Figure 1:
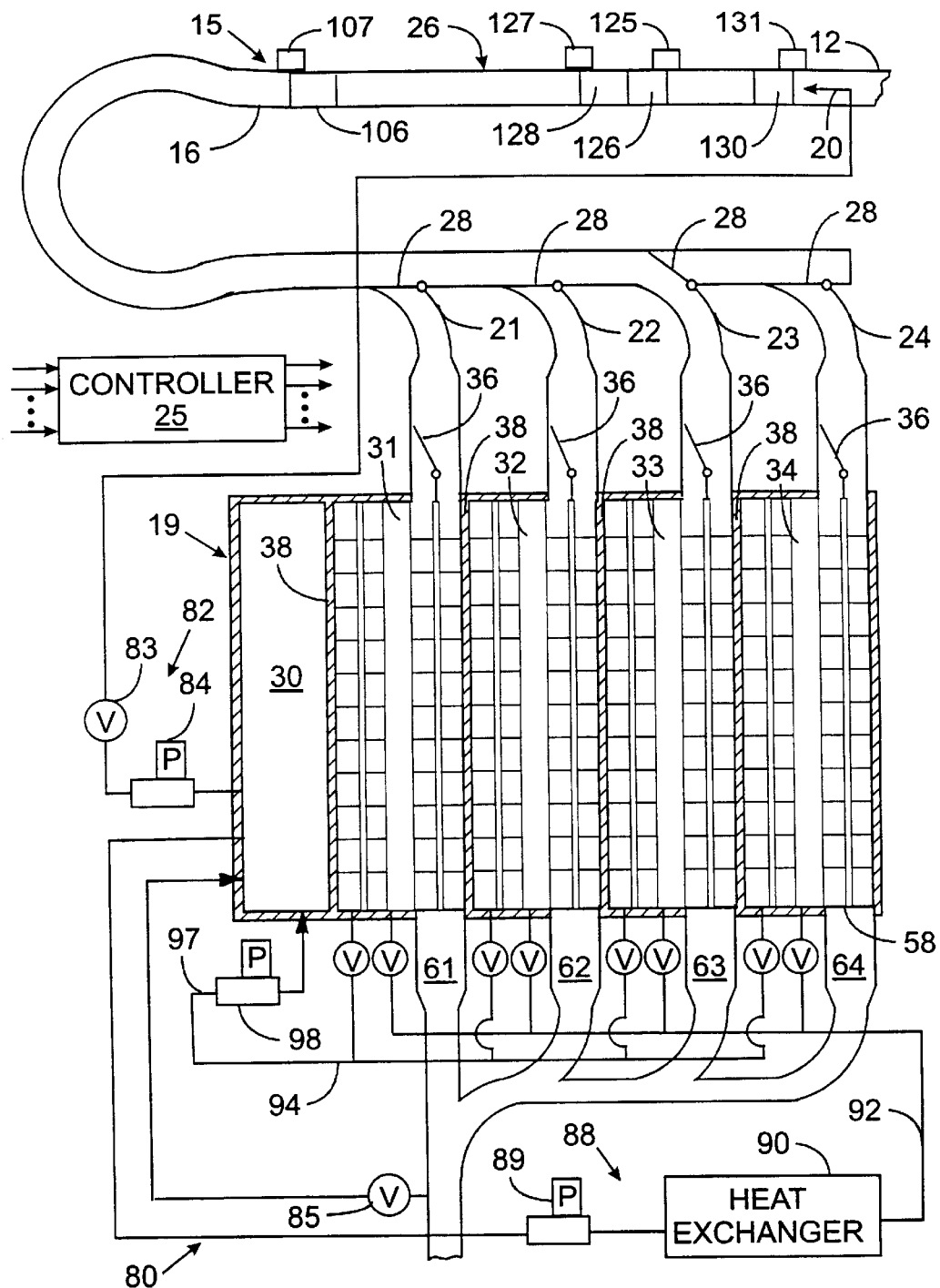
FIG. 1 is a schematic diagram of a cheese cooling and salting apparatus incorporating the present invention.

References herein to directional relationships and movement, such as upper and lower, or left and right, refer to the relationship and operation of the apparatus in the orientation illustrated in the drawings, which may not be the operational orientation in every application of the present invention.

With initial reference to FIG. 1, an apparatus 10 for cooling and salting cheese is connected to the outlet of a conventional cheese molding machine, such as one that produces blocks of mozzarella. Each cheese block emerging from the molding machine enters an inlet 12 of an input flume system 15 formed by a primary flume 16 and four branch channels 21, 22, 23, and 24. The primary flume 16 is a U-shaped, open channel having a width that is less than twice the width of a cheese block thus ensuring that the blocks travel in single file and will not wedge side-by-side clogging the flume. As will be described in greater detail, a variable speed pump creates a flow of brine through the input flume system 15 at a rate up to 300 gallons per minute in a direction indicated by arrow 20. The flow of brine propels floating blocks of cheese through the primary flume 16 and the flow rate determines the speed of the cheese blocks. The cheese blocks enter a staging section 26 of the primary flume 16 where a plurality of blocks accumulate into a group before flowing onward through the remainder of the primary flume, as will be described.

Upon exiting the staging section 26, the group of cheese blocks is directed by a plurality of gates 28 into one of the branch channels 21, 22, 23, and 24 of the flume system. A plurality of sensors, spaced along the primary flume 16, detect the presence of a cheese block at the respective locations and provide input signals to a microcomputer based controller 25 which governs the operation of the gates 28 and other components of the cheese cooling apparatus 10. The series of open U-shaped branch channels 21, 22, 23 and 24 lead to the top of a separate cell 31, 32, 33, or 34, respectively, of a cooling tank 19.

The cooling apparatus 10 can process large blocks of cheese which have a width approximately equal to the width of the entrance of each cell 31–34 of the cooling tank 19. Alternatively smaller blocks that are slightly less than one-half the entrance width can be processed. For this latter version, each branch channel 21–24 has a secondary gate 36 that is operated by a second actuator, such as pneumatic or hydraulic cylinder. Beyond the secondary gate 36, the branch channel 23 is divided in half longitudinally by a vertical wall. The secondary gate 36 directs the smaller cheese blocks into one side of that wall and then into the other side. Additional sensors, located between the secondary gates 36 and the cell entrances, provide sensor signals to the controller 25.

The cooling tank 19 in FIG. 1 is subdivided into four identical cooling cells 31, 32, 33, and 34 defined by walls 38 extending the full height and width of the cooling tank. Four cooling cells are shown for ease of illustration, with the understanding that additional cooling cells can be provided to increase the capacity of the cooling apparatus 10. The cooling tank 19 further includes a brine reservoir 30 which does not receive blocks of cheese. Each of the brine reservoir 30 and cooling cells 31–34 are separate water tight compartments and can be independently drained and filled with brine.

Figure 2:
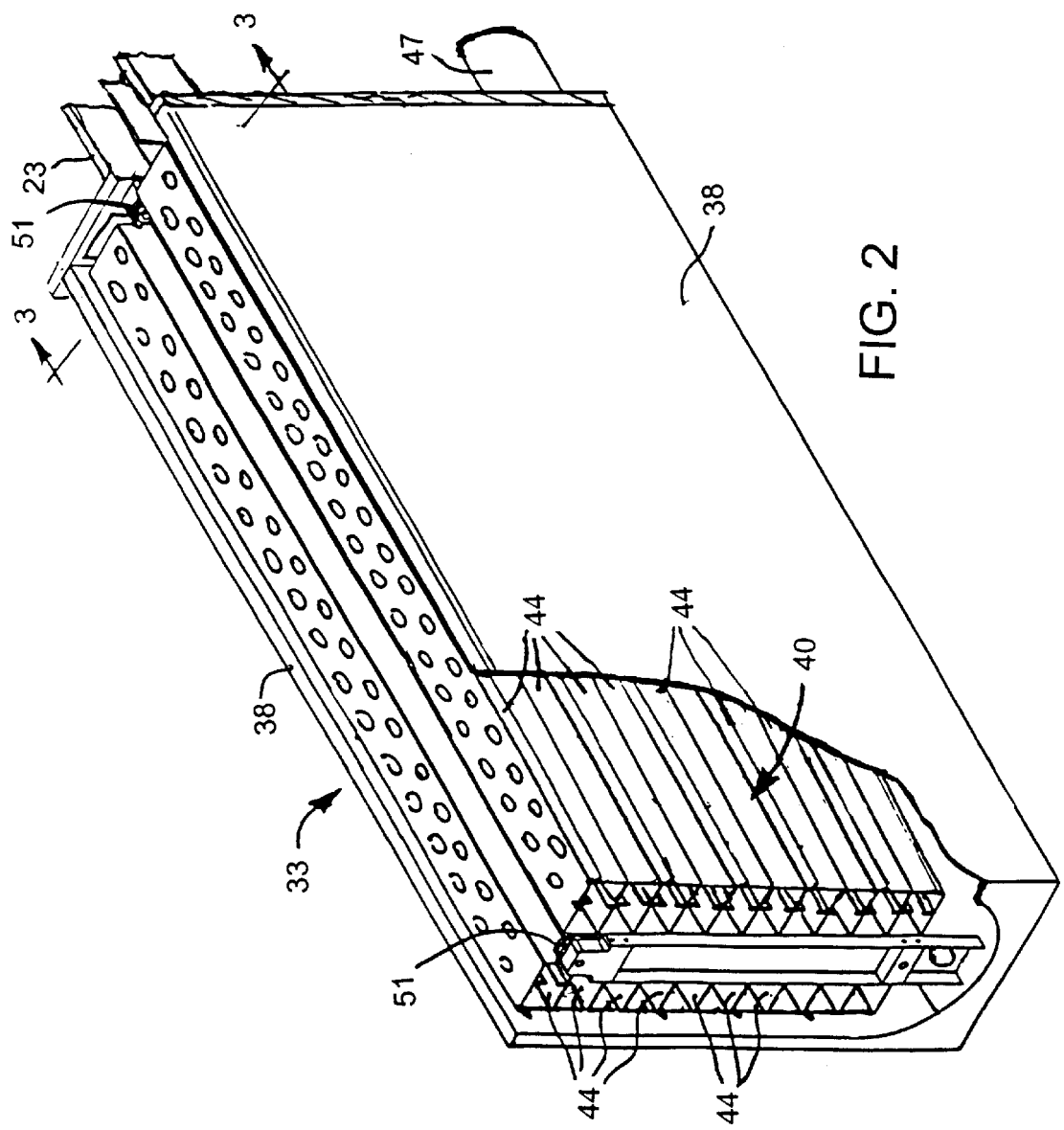
FIG. 2 is an isometric, partial cut-away view of one cell in the cheese cooling and salting apparatus.
Figure 3:
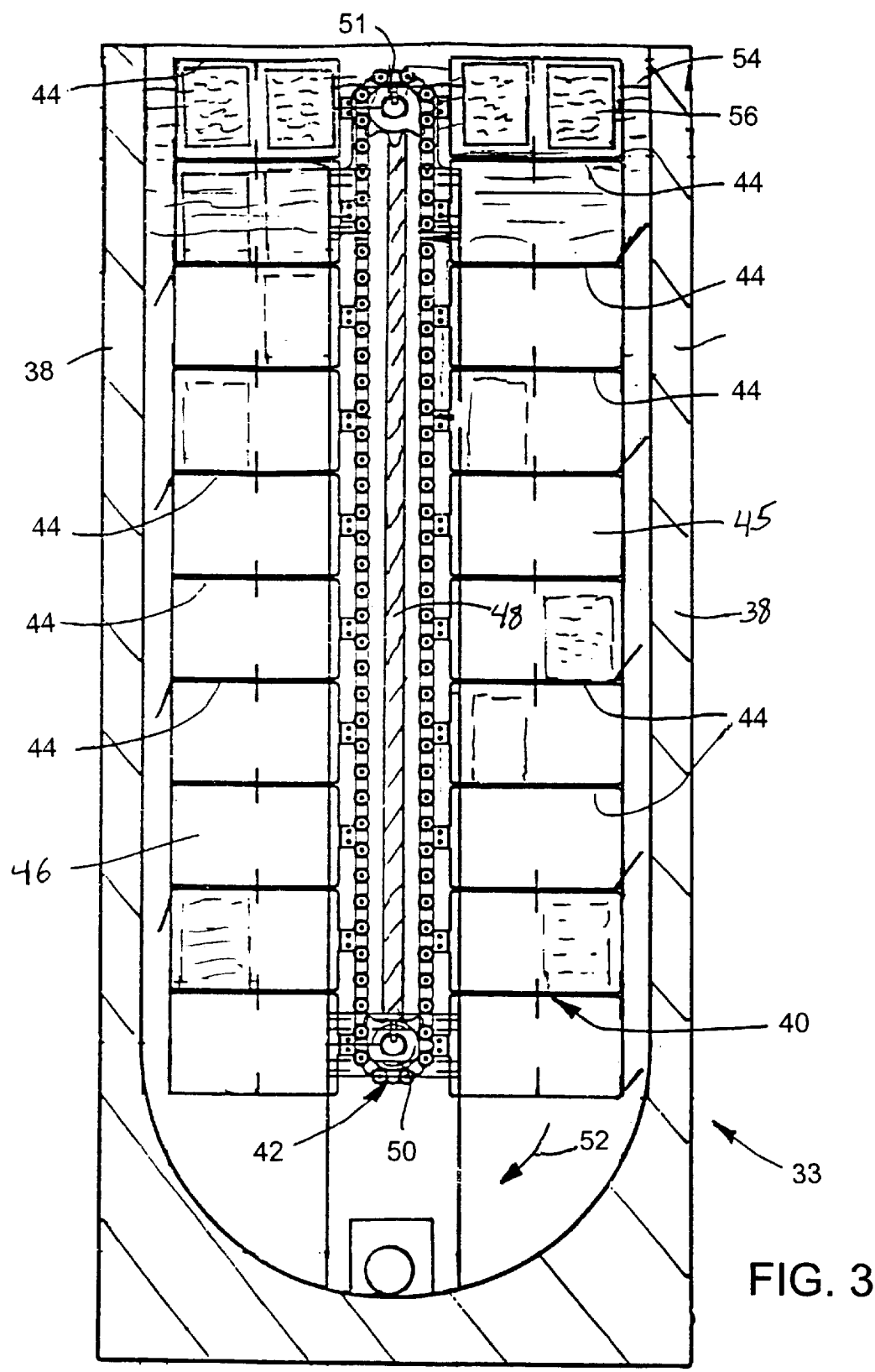
FIG. 3 is a cross-sectional end view along line 3—3 in FIG. 2

Referring to FIGS. 2 and 3, a separate carousel 40 is located within each cooling cell 31–34. The carousel 40 has lower and upper sprockets 50 and 51 with chains 42 mounted thereon. A plurality of elongated tubes 44 fabricated of perforated sheet metal or welded rods at attached to the chains 42, thereby forming receptacles for the cheese blocks. For example, the carousel 40 can have twenty tubes 44 with ten tubes residing in each cooling cell section 45 and 46 at any given time. The tubes 44 rotate in a vertical loop through the cooling cell around the internal wall 48 when the chains 42 are driven by a motor 47 connected to the lower sprocket 50. Thus the chain 42, sprockets 50 and 51 and motor 47 form a drive mechanism for the carousel 40. As the chain rotates 48 in a clockwise direction indicated by arrow 52 in FIG. 3, the tubes 44 in the first section 45 move downward while the tubes move upward in the second section 46. The tubes 44 travel above and below the internal wall 48 between the two sections 45 and 46 of the cooling cell.

The cooling cells 31–34 are filled with brine to a level 54 that is slightly below the top of the upper most tubes 44. As will be described, this level allows the cheese blocks 56 to float into and out of the tube at the top of the first section 45 in each cooling cell. The cheese blocks are not entering or exiting the cell, the level of the brine is raised to cover all the tubes and the cheese contained therein.

Referring again to FIG. 1, each cooling cell 31–34 has an exit opening 58 in a wall that is opposite to the wall having the entrance. A pair of electrically operated exit stops are located side by side in different halves of each exit opening 58 to control the movement of cheese blocks through that opening. Each exit opening 58 of the cooling tank 19 is connected by a separate outlet channel 61, 62, 63 or 64 to an outlet flume 66 of an outlet flume system 60. A control gate 68 is located at the junction of each outlet channel 61–64 with the outlet flume 66 and has an actuator operated by controller 25. A plurality of third sensors are located in the outlet channels 61–64 and in the outlet flume 76 to provide sensor signals to the controller 25. The outlet flume 76 leads to equipment (not shown) for packaging the cheese blocks.

The cheese cooling apparatus 10 includes a brine circulation system 80 that comprises a flume circuit 82 and a cooling circuit 88 shown in FIG. 1. The flume circuit 82 creates a flow of brine that moves the blocks of cheese through the cooling apparatus 10. A first variable speed pump 84 draws brine from the reservoir 30 at a rate up to 300 gallons per minute. The speed of the first variable speed pump 84 and an electrically operated flow valve 83 in the flume circuit 82 are governed by the controller 25. The flow of brine from the first variable speed pump 84 is supplied to the inlet 12 of the primary flume 16, as indicated by arrow 20. This creates flow of brine at a high rate that carries the cheese blocks into the cooling tank 19.

Another electrically operated, proportional valve 85 controls the flow of brine from the outlet flume 76 back to the reservoir 30 and provides the primary means of controlling the fluid levels in the system. The difference in the flow rate from the first variable speed pump 84 and that through the outlet valve 85 determines the rate of level change in the flume systems 15 and 66 and in the cooling cell 33 in which cheese is being exchanged. The pump rate is set for a desired flow velocity in the primary flume 16. Accurate level control is required for proper movement of the cheese.

In addition to the flume circuit 82 that creates a liquid flow which moves the blocks of cheese, the fluid circulation system 80 includes a cooling circuit 88 which circulates refrigerated brine through the cooling tank 19. With continuing reference to FIG. 1, the cooling circuit 88 has a second variable speed pump 89 with an inlet connected to an outlet of the brine reservoir 30. The second variable speed pump 89 supplies brine at a flow rate of 50–100 gallons per minute to a conventional heat exchanger 90 of a refrigeration system, which reduces the temperature of the brine to 25–40 degrees Fahrenheit. The chilled brine from the heat exchanger 90 flows through a distribution conduit 92 to which each of the cooling cells is connected by control valve, which are independently operated by the controller 25. The cooling cells 31–34 also are coupled by another set of independently operated control valves to a drain conduit 94 which leads to the input of a drain pump 98, that feeds into the brine reservoir 30. By selectively operating the selected ones of these control valves the drain pump can be used to empty brine from a cooling cell 31–34 that needs maintenance.

The rotational movement of the carousel 40 in each cooling cell 31–34 acts as a paddle wheel pushing the brine solution from one cell over the walls 43 into the adjacent cooling cell. This action causes the brine to flow through the cooling cells in a sequential manner. Alternatively, inter-cell pumps can be provided to transfer the brine from one cell to another.

The cheese to be cooled enters the primary flume inlet 12 and the flow of brine carries the floating cheese into the cooling apparatus 10. This enables the cheese blocks to be loaded into and removed from the cooling tank 19 entirely without human intervention.

In order to coordinate the flow of cheese blocks into the carousel tubes 44 in a selected cooling cell 31–34, the cheese blocks are assembled into groups in the staging section 26 of the primary flume 16 as shown in detail in FIG. 4. This flume section 26 has a bottom wall 100 and a horizontal interior wall 102 extending across the width of the primary flume 16, thereby forming a false bottom which divides the primary flume into upper and lower channels 104 and 105, respectively. The flow of liquid brine through the staging section 26 is evenly divided between the two channels, as the cheese blocks accumulate in the staging section 26. Beyond the outlet of the staging section an outlet flow control gate 106 is lowered by an actuator 107 to direct the full flow volume into the upper channel 104 thereby increasing the flow rate in that portion of the primary flume.

In the state depicted in FIG. 4, a first stop mechanism 110 detains a plurality of cheese blocks 118 in the staging section 26. In the preferred embodiment, the first stop mechanism 110 comprises an actuator, such as an endless conveyor 111 driven by a motor 112, and a pair of stop members 108 and 109 attached to the conveyor. Each stop member 108 and 109 may be a metal rod or an open fence which forms a barrier to the cheese blocks in the upper flume channel 104, yet does not significantly impede brine flow. The endless conveyor 111 extends along side the staging section. When one of the stop members (e.g. 108) is positioned downward into the brine solution 114, the other stop member (e.g. 109) is facing upward at the opposite end of the endless conveyor 111. A proximity sensor 116 detects the presence of the other stop member in this position and produces a signal indicating that the first stop mechanism 110 is in a first position that obstructs blocks of cheese in the primary flume. This position of the stop member 108 defines an outlet boundary of the staging section 26.

The blocks of cheese 118 float on the surface of the brine 114 as they flow along the upper channel 104 from the inlet 12. These blocks pass beneath a sensor 120 which has an arm 122 with a wheel 124 located at the remote end. Each moving cheese block 118 strikes the wheel and pushes the arm upward, as shown in FIG. 4, so that the block is able to pass beneath the sensor 120. The cheese block sensor 120 detects the upward movement of the arm and the rotation of the wheel 124. This detection provides a pair of signals to the controller 25 of the cooling system 10.

The cheese block sensor 120 defines an inlet boundary of the staging section 26 which has a length approximately equal to the length of each carousel tube 44 in the cooling tank 19. Therefore, the group of cheese blocks which accumulates in the staging section will fill a single carousel tube. It should be noted that the group of cheese blocks may be shorter than the tube length, but should not be longer than the carousel tubes. By grouping the cheese blocks by length, rather than by quantity, the cooling system 10 can accommodate cheese blocks of different sizes. It will be understood by cheese makers that different types of cheese are formed in blocks of different lengths. Thus, ten blocks of mozzarella may fit within a tube of the carousel, whereas only eight larger blocks of provolone may be so received. Thus, operation of the staging section is unperturbed by variation in the length of the individual cheese blocks and thus the number of blocks, because the operation responds to the overall length of the group of cheese blocks that accumulate.

With reference to FIG. 5, eventually the requisite length of cheese blocks 118 accumulates in the staging section 26. When this occurs, the arm 122 of the cheese block sensor 120 remains in the raised position and the wheel 124 does not turn. This condition of the detector 20 is recognized by the controller 25 as indicating that the staging area 26 is now filled with the proper amount of cheese to fill a carrousel tube 44.

The controller 25 responds to this indication by activating an actuator 125 that raises a second stop mechanism, formed by stop gate 126, along the internal horizontal wall 102 at the inlet of the staging section. This stop gate 126 presents a barrier to additional cheese blocks entering the staging section 26, but has an open structure which does not impede the brine flow. The force of the brine flow through the primary flume 16 may cause the next cheese block 119 to rise onto the stop gate 126 slightly above the level of the brine 114. However, the force of that brine flow is insufficient to drive that cheese block 119 over the stop gate 126. Additional cheese blocks 121 from the molding equipment will be detained behind the second stop mechanism, formed by stop gate 126.

Once the stop gate 126 has been raised, the first stop mechanism 110 is activated so that the conveyor 111 raises the stop members 108 and 109 out of the primary flume 16 and into a horizontal position, shown in FIG. 6. With the first stop mechanism 110 in this second position, the accumulated group of cheese blocks 118 is able to exit the staging section 26. To facilitate movement of the cheese blocks, a first flow control gate 128, located in the horizontal interior wall 102 at the inlet of the staging section, is pivoted downward by an actuator 127 until abutting the bottom wall 100 of the primary flume. The solid panel of the first flow control gate 128 directs the flow of brine in the lower channel 105 into the upper channel 104 so that the full volume of liquid flowing in the primary flume passes through the upper channel in the staging section 26. The concentration of the liquid flow into the upper channel 104 provides force which quickly overcomes the inertia of the stationary blocks of cheese 118 that had accumulated in the staging section 26. This drives the accumulated cheese blocks 118 out of the staging section, leftward in the drawings, through the remaining portion of the input flume system 15 and into the cooling tank 19. Although the lesser flow rate previously present in the upper channel 104 eventually would have driven the accumulated cheese blocks 118 from the staging section 26, directing the full amount of the flume flow into the upper channel rapidly clears the staging section so that additional cheese blocks 121 can be received from the cheese molding machine at the primary flume inlet 12.

With reference to FIG. 7, the sensor arm 122 dropping down indicates that the accumulated group of cheese blocks has begun to move from the staging section 26. After a short delay to ensure that the last cheese block 118 in that group has moved far enough into the staging section 26, the first stop mechanism 110 is activated to rotate the endless conveyor 111 in a direction indicated by arrow 115. This rotation causes the second stop member 109 to drop into the brine solution 114 and move with the flow of liquid in the upper channel 104. Then the second stop mechanism is activated to move the stop gate 126 downward parallel to the interior wall 102 so that another group of cheese blocks 119 and 121 can accumulate in the staging section 26 behind the second stop member 109.

At the same time, the first control gate 128 is raised and a second flow control gate 130, between the first flow control gate 128 and the primary flume inlet 12, is lowered by an actuator 131. This second flow control gate 130 directs the full volume of the brine flow into the upper channel 104 providing a force which overcomes the inertia of the stationary cheese blocks 119 and 121 which were retained by the second stop mechanism, stop gate 126. The increased flow forces those stationary cheese blocks forward into the staging section 26 behind the second stop member 109. Thus, as the second stop member 109 moves toward the outlet end of the staging section 26, cheese blocks flow with it.

Eventually, the first stop member 108 passes under the proximity sensor 116 which signals the controller 25 of that event. The controller responds by stopping the endless conveyor 111, thereby placing the second stop member 109 at the outlet end of the staging section 26 in the position where the first stop member 108 had been previously positioned, as shown in FIG. 4. At this time both the second and third flow control gates 128 and 130 are raised to again divide the liquid flow in the staging section between the upper and lower channels 104 and 105. The outlet flow control gate 106 is lowered. This provides a region for another group of cheese blocks 119 and 121 to accumulate in the staging section 26, thus repeating the staging cycle depicted in FIGS. 4–7.

By accumulating of a group of cheese blocks 118 within the staging section 26, the arrival of cheese blocks at the entrance of the selected cooling cell 33 is spread out in time, providing time for the carousel 40 to align each tube 44 sequentially with the cooling cell entrance to receive cheese blocks. This action facilitates automation of the cheese cooling process and reduces the human intervention required to move the blocks of cheese.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. In cheese processing apparatus having a flume through which blocks of cheese are conveyed by flow of a liquid, a staging section in the flume comprising:
    a first stop mechanism having a first state which detains blocks of cheese in the staging section and having a second state in which blocks of cheese are able to travel in the flume from the staging section;
    a sensor for detecting how much cheese has been detained by the first stop mechanism; and
    a controller connected to the first stop mechanism and the sensor and responding to a predefined amount of cheese being detained by the first stop mechanism by placing the first stop mechanism into the second state to allow blocks of cheese to exit the staging section.

2. The staging section as recited in claim 1 wherein the sensor detects when a predefined length of blocks of cheese have been detained by the first stop mechanism.

3. The staging section as recited in claim 1 wherein first stop mechanism comprises a stop member for engaging a block of cheese in the flume, and an actuator for moving the stop member.

4. The staging section as recited in claim 1 wherein the first stop mechanism comprises first and second stop members, and an endless conveyor which moves the first and second stop members to selectively engage blocks of cheese in the flume.

5. The staging section as recited in claim 1 further comprising a second stop mechanism located in the flume upstream of the staging section and having a third state in which blocks of cheese are prevented from entering the staging section and a fourth state in which blocks of cheese are able to enter the staging section.

6. The staging section as recited in claim 5 wherein the second stop mechanism is in the third state while blocks of cheese exit the staging section.

7. The staging section as recited in claim 5 wherein the controller activates the second stop mechanism into the third state in response to the sensor detecting that the predefined amount of blocks of cheese has been detained by the first stop mechanism.

8. The staging section as recited in claim 1 further comprising:
    an interior wall dividing the flume into a first channel and a second channel; and
    a first flow control gate which selectively directs flow of liquid in the second channel into the first channel in the staging section.

9. The staging section as recited in claim 8 wherein the first flow control gate is located upstream of an inlet to the staging area.

10. The staging section as recited in claim 8 further comprising a first flow control gate in the flume upstream of the first flow control gate to selectively direct flow of liquid from the second channel into the first channel.

11. The staging section as recited in claim 8 further comprising:
   a second stop mechanism located in the flume upstream of the staging section and having a third state in which blocks of cheese are prevented from entering the staging section and a fourth state in which blocks of cheese are able to enter the staging section; and
   a first flow control gate in the flume upstream of the second stop mechanism to selectively direct flow of liquid in the second channel into the first channel.

12. The staging section as recited in claim 1 wherein the sensor comprises a moveable arm with a wheel mounted thereon for engaging the blocks of cheese.

13. The staging section as recited in claim 12 wherein the sensor is positioned such that a block of cheese traveling into the staging section produces movement of the arm and rotation of the wheel.

14. The staging section as recited in claim 13 wherein when a predefined amount of cheese is being detained by the first stop mechanism the arm of the sensor remains moved by a block of cheese however rotation of the wheel fails to occur.

15. In cheese processing apparatus having a tank containing a liquid, receptacles to hold blocks of cheese in the tank, and a flume through which blocks of cheese are conveyed into the tank, a staging section in the flume comprising:
   a first stop mechanism movable between a first position in which blocks of cheese are prevented from traveling in the flume and a second position in which blocks of cheese are able to travel from the staging section;
   a second stop mechanism located upstream of the first stop mechanism, and having a first state in which blocks of cheese are prevented from traveling in the flume and a second state in which blocks of cheese are able to travel along the flume toward the first stop mechanism;
   a sensor for detecting an amount of blocks of cheese that has been detained by the first stop mechanism; and
   a controller connected to the first stop mechanism, the second stop mechanism and the sensor, and responding to a predefined amount of blocks of cheese having been detained by placing the first stop mechanism into the second position and placing the second stop mechanism into the first state.

16. The staging section as recited in claim 15 wherein the predefined amount of blocks of cheese corresponds to a cheese holding capacity of one of the receptacles.

17. The staging section as recited in claim 15 further comprising:
   an interior wall dividing the flume into a first channel and a second channel wherein the blocks of cheese travel through the first channel; and
   a first flow control gate in the flume proximate to an inlet of the staging section to selectively direct flow of liquid from the second channel into the first channel.

18. The staging section as recited in claim 17 further comprising a first flow control gate in the flume upstream of the second stop mechanism to selectively direct flow of liquid in the second channel into the first channel.

19. The staging section as recited in claim 18 wherein the first flow control gate directs flow of liquid from the second channel into the first channel when the first stop mechanism is in the second position, and the first flow control gate directs flow of liquid from the second channel into the first channel when the second stop mechanism is in the second state.

20. A method of staging blocks of cheese traveling through a flume of a cheese processing apparatus, said method comprising:
   detaining blocks of cheese in a staging section formed behind a first stop mechanism;
   sensing how much cheese has been detained by the first stop mechanism; and
   determining when a predefined amount of cheese being detained by the first stop mechanism and in response thereto producing a control signal; and
   in response to the control signal, moving the first stop mechanism into a given position that allows blocks of cheese pass to exit the staging section.

21. The method as recited in claim 20 further comprising activating a second stop mechanism to prevent cheese blocks from entering the staging section when the first stop mechanism is in the given position.

22. The method as recited in claim 20 further comprising:
   dividing the flume into a first channel and a second channel, wherein the blocks of cheese are retained in the first channel; and
   directing liquid flowing in the second channel into the first channel when the first stop mechanism is in the given position.

23. The method as recited in claim 20 further comprising:
   dividing the flume into a first channel and a second channel, wherein the blocks of cheese are retained in the first channel;
   activating a second stop mechanism to prevent cheese blocks from entering the staging section when the first stop mechanism is in the second position;
   directing liquid flowing in the second channel into the first channel in the staging section when the first stop mechanism is in the given position; and
   directing liquid flowing in the second channel into the first channel upstream of the second stop mechanism when the second stop mechanism is not being activated to prevent cheese blocks from entering the staging section.

* * * * *